United States Patent
Elliott et al.

(10) Patent No.: US 6,936,992 B2
(45) Date of Patent: Aug. 30, 2005

(54) SYNCHRONIZATION OF MACHINE AND LOAD CHARACTERISTICS

(75) Inventors: Charles Richard Elliott, Leeds (GB); Michael Leo McClelland, Leeds (GB)

(73) Assignee: Switched Reluctance Drives Limited, Harrogate (GB)

( * ) Notice: Subject to any disclaimer, the term of this patent is extended or adjusted under 35 U.S.C. 154(b) by 101 days.

(21) Appl. No.: 10/146,081

(22) Filed: May 15, 2002

(65) Prior Publication Data

US 2002/0175653 A1 Nov. 28, 2002

(30) Foreign Application Priority Data

May 24, 2001 (GB) .............................................. 0112673

(51) Int. Cl.$^7$ .............................. H02P 1/46; H02P 3/18; H02P 5/28; H02P 7/36
(52) U.S. Cl. ....................... 318/701; 318/254; 318/432; 318/433; 318/434
(58) Field of Search ................................ 318/701, 254, 318/138, 139, 434, 700, 439

(56) References Cited

U.S. PATENT DOCUMENTS

| | | | | |
|---|---|---|---|---|
| 4,698,537 A | * | 10/1987 | Byrne et al. ................. | 310/168 |
| 4,894,572 A | * | 1/1990 | Shiraki ...................... | 310/68 B |
| 4,973,869 A | * | 11/1990 | Cho .......................... | 310/68 B |
| 5,015,903 A | * | 5/1991 | Hancock et al. ............. | 310/168 |
| 5,272,428 A | * | 12/1993 | Spiegel et al. .............. | 318/803 |
| 5,458,098 A | | 10/1995 | Yagi et al. | |
| 5,530,332 A | * | 6/1996 | Rees ......................... | 318/685 |
| 5,619,113 A | * | 4/1997 | Bahn ......................... | 318/701 |
| 5,677,606 A | * | 10/1997 | Otake ........................ | 318/434 |
| 5,905,355 A | * | 5/1999 | Fulks et al. ................. | 318/701 |
| 6,040,634 A | | 3/2000 | Larguier | |
| 6,339,310 B1 | * | 1/2002 | Sugiyama et al. .......... | 318/783 |
| 6,453,863 B1 | | 9/2002 | Pels et al. | |
| 6,465,977 B1 | * | 10/2002 | Farkas et al. ............... | 318/432 |

FOREIGN PATENT DOCUMENTS

WO 99/54621 10/1999

OTHER PUBLICATIONS

Alakuela, M., et al., "A 40 KW Switched Reluctance Engine Starter/Generator System for an Electric Hybrid Vehicle," 7$^{th}$ European Conference on Power Electronics and Applications, EPE 1997, pp. 4.717–4.720.

Copy of Partial European Search Report for European Patent Application No. 02253629, mailed Jun. 22, 2004.

Stephenson, et al., "The Characteristics, Design and Applications of Switched Reluctance Motors and Drives," PCIM '93, Nürnberg, Germany, Conference & Exhibition, Jun. 21–24, 1993, pp. 1–68.

Husain, et al., "Torque Ripple Minimization in Switched Reluctance Motor Drives by PWM Current Control," IEEE, 1994, pp. 72–77.

Fulton, Dr. N., "Motors, Motor Control and Drives," Newnes Electrical Engineer's Handbook, pp. 237–263.

\* cited by examiner

Primary Examiner—David Martin
Assistant Examiner—Renata McCloud
(74) Attorney, Agent, or Firm—Dicke, Billig & Czaja, PLLC (57) ABSTRACT

An electrical machine is coupled to a load which has a torque profile which varies with angle. The machine is coupled so that the torque ripple of the machine is synchronized with the torque ripple of the load in such a manner as to provide an efficient drive system which can start at any angular position. This allows the size of the electrical machine to be reduced to a point where its average torque may be below the peak requirement of the load.

12 Claims, 7 Drawing Sheets

SYNCHRONIZATION OF MACHINE AND LOAD CHARACTERISTICS

CROSS REFERENCE TO RELATED APPLICATION

The subject matter of this application is related to the subject matter of British Application No. 0112673.9, filed May 24, 2001, priority to which is claimed under 35 U.S.C. § 119 and which is incorporated herein by reference.

BACKGROUND OF THE INVENTION

1. Field of the Invention

The present invention generally relates to a system and method of driving a load having a cyclically variable input requirement. More particularly, but not exclusively, the invention relates to the synchronization of the output characteristic of an electrical machine with the load characteristic of the apparatus to which it is coupled.

2. Description of Related Art

Many types of rotating electrical machines are known for coupling to mechanical equipment, either to act as motors and thus drive the equipment by supplying mechanical power to it, or to act as generators and thus be driven by the equipment by drawing mechanical power from it. General descriptions and classifications of these types of electrical machines can be found in many standard textbooks, e.g. Chapter 10 of Newnes Electrical Engineer's Handbook, edited by D. F. Warne and published by Butterworth-Heineman 2000, incorporated herein by reference. In general, the requirements for coupling the machine and the mechanical equipment center on the quality of alignment of their shafts, i.e. the installer seeks to minimize any radial or parallax errors between the axes of the shafts. Consideration is not normally given to the angular (i.e. the rotational) alignment of the shafts.

One such type of machine is the switched reluctance machine which, in recent years, has returned to prominence as a type to be considered for variable-speed applications. The general theory of the design and operation of switched reluctance machines is well known and is discussed, for example, in "The Characteristics, Design and Applications of Switched Reluctance Motors and Drives", by Stephenson and Blake and presented at the PCIM '93 Conference and Exhibition at Nuremberg, Germany, Jun. 21–24, 1993 and incorporated herein by reference.

The switched reluctance machine is generally constructed without windings or permanent magnets on the moving part (generally called the rotor). The stationary part of most switched reluctance machines (called the stator) includes coils wound around stator poles that generally carry unidirectional current. In one type of switched reluctance motor, coils around opposing stator poles are connected in series or parallel to form one phase winding of a potentially multi-phase switched reluctance machine. Motoring torque is produced by applying a voltage across each of the phase windings in a predetermined sequence that is synchronized with the angular position of the rotor so that a magnetic force of attraction results between poles of the rotor and stator as they approach each other. Similarly, generating action is produced by positioning the pulse of voltage in the part of the cycle where the poles are moving away from each other. In typical operation, each time a phase winding of the switched reluctance machine is energized, magnetic flux is produced by the phase winding, thereby causing a force of attraction on the rotor poles.

The most common form of switched reluctance machines are rotary and cylindrical, with an internal rotor. However, inverted, linear and segmented machines are also known. Embodiments of the invention are applicable to the different types of machine.

In order to maintain the torque and related speed developed by a switched reluctance machine, it is desirable to control carefully the instants at which voltage is applied to the phase windings of the motor. A wide variety of control schemes exists and some of these schemes are discussed in the Stephenson paper cited above.

Different types of electrical machines have characteristically different profiles of torque as a function of angle, and it is often these characteristics (known or perceived) which influence a designer when selecting an electrical machine to fulfil a particular duty. For example, it is traditionally held that DC machines have a particularly smooth torque/angle profile (i.e. they have low torque ripple) and these machines are often chosen for, e.g., driving the rolls in a steel mill or driving the traverse of a grinding machine in the expectation that the lack of torque ripple will enable the production of a high quality product. By contrast, it is known that the single-phase induction motor has a very high torque ripple (since the torque is produced by a pulsating, rather than a rotating field), so it would not be considered a good choice for applications where, say, the load had a low inertia and was sensitive to torque ripple.

One of the criticisms which is frequently levelled at the switched reluctance machine is that it has inherently high torque ripple which can only be suppressed at the expense of degrading the magnitude of the average torque or uprating the power converter to handle higher currents than would otherwise be required. In the opinion of many researchers, this is a major weakness of the switched reluctance machine and precludes it from the wider application it might otherwise enjoy. For example, the paper "Torque ripple minimization in switched reluctance motor drives by PWM current control" by Husain and Ehsani, Proc of IEEE 9th Applied Power Electronics Conference, Orlando, Fla. Feb. 13–17 1994, pp 72–77, incorporated herein by reference, contains a detailed discussion of the mechanism of torque ripple and describes the development of one method of reducing it. It has been accepted up to now that the concept of torque ripple involves a variable output which has to be reduced. However, attempts to minimize torque ripple according to known methods typically also reduce the average torque available from the motor.

SUMMARY OF THE INVENTION

According to one embodiment of the present invention there is provided a method of driving a load having a cyclically variable input requirement, the method comprising: driving the load by an electric motor having a cyclically variable output, including a low output in its cycle which is less than a peak in the variable input requirement of the load; and coupling the motor with respect to the load so that a peak input requirement of the load coincides with a region in the output cycle of the motor in which it is exceeded by the instantaneous output from the motor.

According to another embodiment of the invention there is provided a method of driving a load, having a cyclically variable input requirement and a generally repeatable rest position, by an electric motor having a cyclically variable output, the method comprising: coupling the motor with respect to the load such that the cyclically variable output is rising at start-up to boost the acceleration of the load from the rest position.

Embodiments of the invention, rather than seeking to suppress the output ripple of an electrical machine, such as a switched reluctance machine, provide a way of capitalizing on it by harnessing it when the machine is coupled to a load which also has input (load) ripple or a starting requirement involving rapid acceleration. The peak load demand can be arranged substantially to coincide with a region in the varying output in which the electric motor output is better suited to meet the demand. Thus, in one form of the invention the average output from the motor can actually be less than the peak demand, as long as the envelope of the load demand is covered by that of the motor output. In another form of the invention the coupling between the electric motor and the load can be arranged to provide a peak output at or near the position of the load at start-up to boost the initial acceleration by taking advantage of the output peak from the motor. This way of redefining the problem of torque ripple enables the motor to be utilized more efficiently and cost-effectively without the need for output ripple reduction techniques.

In one aspect, the output of the motor and the load demand are torque, and the period of the output cycle of the motor is equal to or an integral dividend of the cyclical torque demand of the load.

According to one form of the invention there is provided a method of starting an internal combustion engine, having a cyclically variable starting torque requirement, the method comprising: coupling the engine to a switched reluctance machine having a torque output with a cyclically variable ripple, having a period equal to or an integral dividend of the period of the starting torque, and which includes a low torque output which is less than a peak in the starting torque requirement of the engine; and arranging the angular orientation of the motor and the engine so that a peak in the starting torque requirement coincides with a region in the torque output in which the starting torque is exceeded by the instantaneous torque of the motor.

According to another form of the invention there is provided a starter system for an internal combustion engine having a cyclically variable starting torque requirement, the system comprising: a switched reluctance machine, having a torque output with a cyclically variable ripple having a period equal to or an integral dividend of the period of the starting torque, and including a low torque output which is less than a peak in the starting torque requirement of the engine, the machine being coupled to the engine such that a peak in the starting torque requirement coincides with a region in the torque output in which the starting torque is exceeded by the instantaneous torque of the motor.

In a further form of the invention there is provided a method of starting an internal combustion engine having a variable starting torque requirement, the method comprising: coupling the engine to a switched reluctance machine having a torque output with a cyclically variable ripple, and which includes a peak output; arranging the relative angular orientation of the motor and the engine so that a peak in the starting torque of the motor is at or near coincident with the position of the motor at rest.

More particularly, an embodiment of the present invention relates to the operation of a switched reluctance drive coupled to an internal combustion engine so that the switched reluctance machine is operable both as a motor to start the engine and as a generator driven by the engine.

BRIEF DESCRIPTION OF THE DRAWINGS

Other aspects and advantages of the invention will become apparent upon reading the following detailed description of exemplary embodiments of the invention and upon reference to the accompanying drawings, in which:

FIGS. 3(*a*), (*b*) & (*c*) are plots of voltage, phase current and supply current respectively vs. rotor angle for a switched reluctance drive operating in single-pulse mode;

DETAILED DESCRIPTION OF PREFERRED EMBODIMENTS

Figure 1:
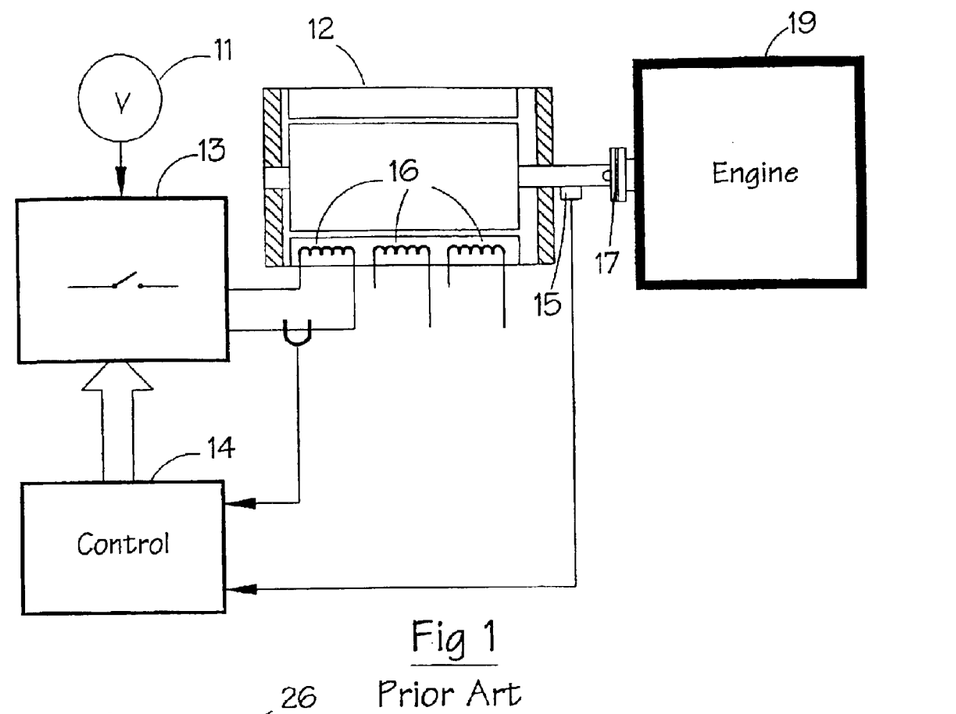
FIG. 1 is a schematic diagram of a switched reluctance drive connected to an engine.

For the sake of example, the following description of the principles of the invention is based on a switched reluctance machine and an internal combustion (i.e.) engine, constituting a load. While the invention can be applied with particular benefit to this combination, it should be understood that the invention can be applied to other types of electrical machine and other loads. FIG. 1 shows a typical switched reluctance drive in schematic form, where the switched reluctance machine 12 is connected to the i.e. engine 19 by a coupling 17. The input DC power supply 11 can be either a battery or rectified and filtered AC mains. The DC voltage provided by the power supply 11 is switched across the phase windings 16 of the motor 12 by a power converter 13 under the control of the electronic control unit 14. The switching must be correctly synchronized to the angle of rotation of the rotor for proper operation of the drive, and a rotor position detector 15 is typically employed to supply signals corresponding to the angular position of the rotor. The rotor position detector 15 may take many forms, including that of a software algorithm, and its output may also be used to generate a speed feedback signal.

Embodiments of the invention are particularly suitable for a starter/generator for an internal combustion engine in which the machine is operated as a motor to crank the internal combustion engine to start it, and is operated as a generator while the internal combustion engine is running. The coupling 17 is depicted as a conventional direct coupling to which the shafts of the motor and the load are mounted and then angularly adjusted according to principles of the invention to be described. Once the correct angular positioning is achieved the coupling 17 is tightened up. Devices maintaining angular integrity between the output and input, other than the coupling 17, include toothed drives and other indexed transmission systems as are known to the skilled person.

Many different power converter topologies are known, several of which are discussed in the Stephenson paper cited above. One of the most common configurations is shown for a single phase of a polyphase system in FIG. 2, in which the phase winding 16 of the machine is connected in series with two switching devices 21 and 22 across the busbars 26 and 27. Busbars 26 and 27 are collectively described as the "DC link" of the converter. Energy recovery diodes 23 and 24 are connected to the winding to allow the winding current to flow back to the DC link when the switches 21 and 22 are opened. A capacitor 25, known as the "DC link capacitor", is connected across the DC link to source or sink any alternating component of the DC link current (i.e. the so-called "ripple current") which cannot be drawn from or returned to the supply. In practical terms, the capacitor 25 may comprise several capacitors connected in series and/or parallel and, where parallel connection is used, some of the elements may be distributed throughout the converter. A current measuring resistor 28 is often included in series with the bottom switch 22.

According to the switching timing, the power converter is used to operate the switched reluctance machine as a motor to drive the internal combustion engine 19, or as a generator to be driven by the internal combustion engine for delivering energy to the power supply 11. This form of reconfiguration of the electrical machine is well known to the person of ordinary skill in the art.

Figure 2:
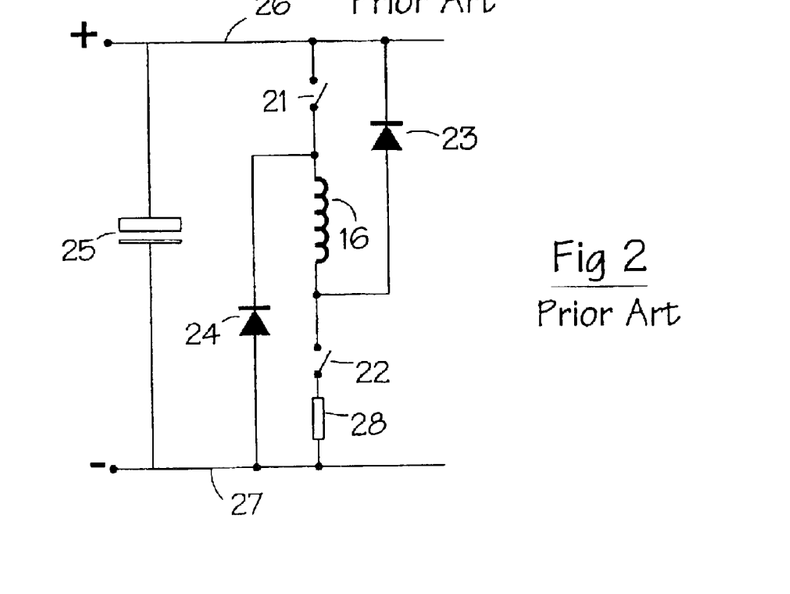
FIG. 2 is a prior art switching circuit used for switched reluctance systems.
Figure 3A:
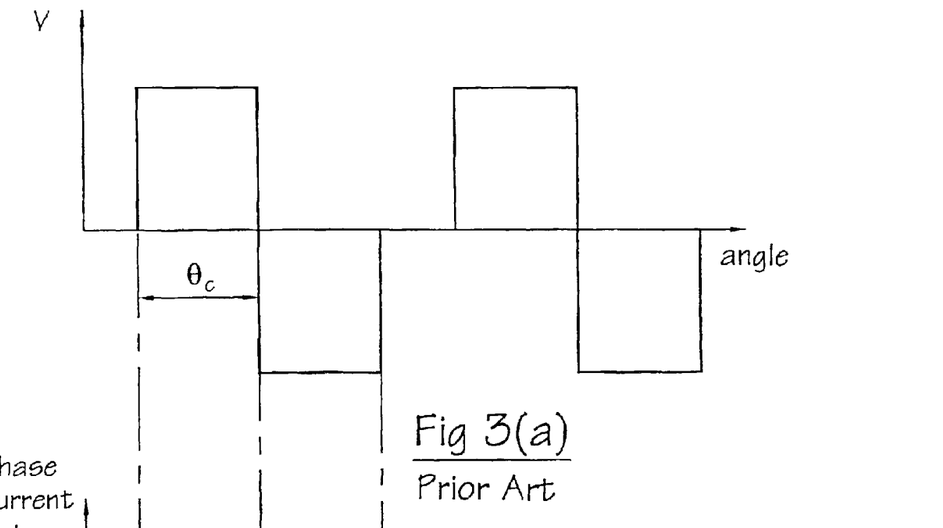
Figure 3B:
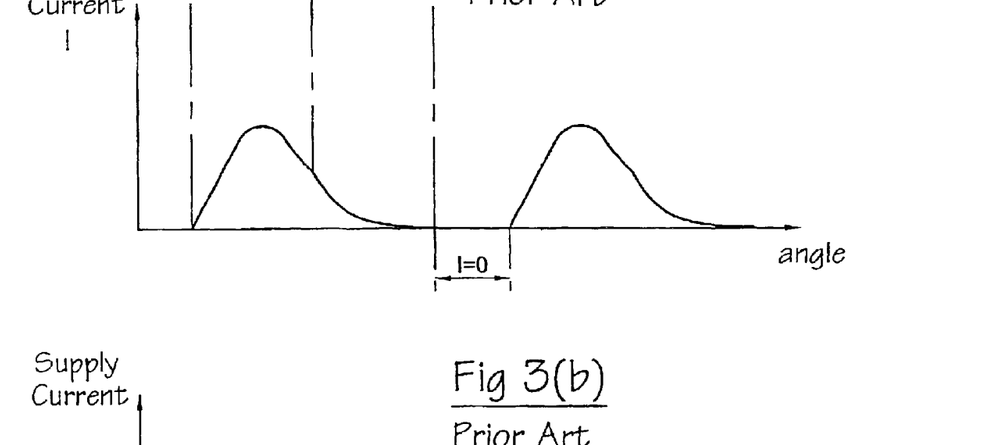
Figure 3C:
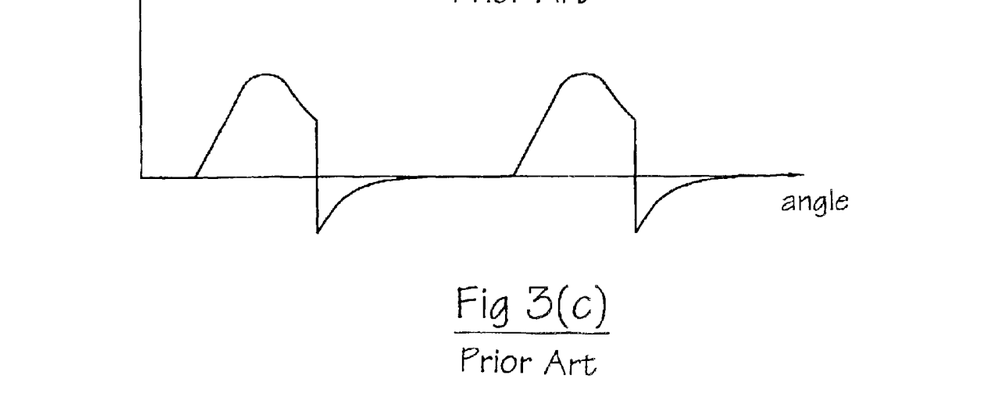

FIG. 3 shows typical waveforms for a motoring cycle of the circuit shown in FIG. 2. FIG. 3(a) shows the voltage being applied for the duration of the conduction angle $\theta_c$ when the switches 21 and 22 are closed. FIG. 3(b) shows the current in the phase winding 16 rising to a peak and then falling slightly. At the end of the conduction period, the switches are opened and the current transfers to the diodes, placing the inverted link voltage across the winding and hence forcing down the flux and the current to zero. At zero current, the diodes cease to conduct and the circuit is inactive until the start of a subsequent conduction period. The current on the DC link reverses when the switches are opened, as shown in FIG. 3(c), and the returned current represents energy being returned to the supply. The shape of the current waveform varies depending on the operating point of the machine and on the switching strategy adopted. As is well-known and described in, for example, the Stephenson paper cited above, low-speed operation generally involves the use of current chopping to contain the peak currents, and switching off the switches non-simultaneously gives an operating mode generally known as "freewheeling".

Figure 4:
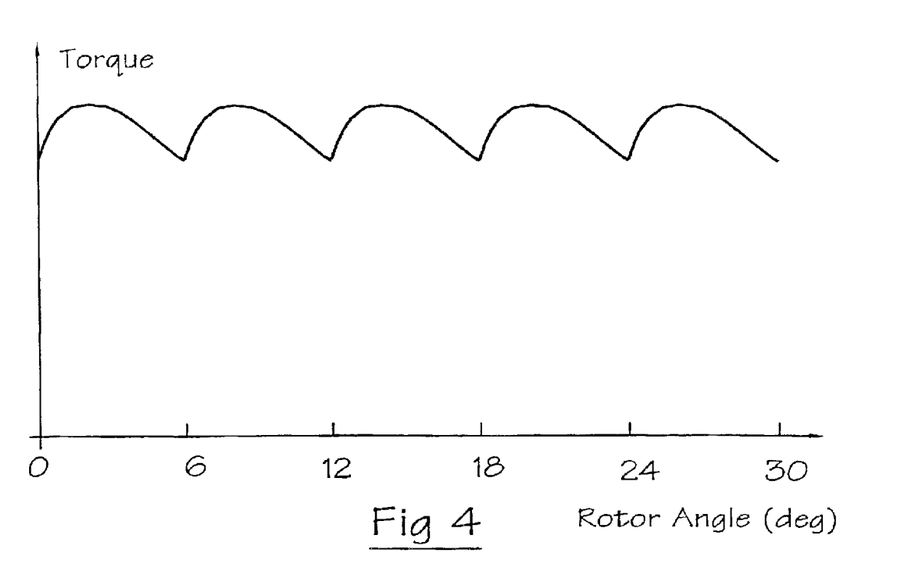
FIG. 4 shows the torque ripple of a typical switched reluctance machine operating with one phase on at any angle.
Figure 5:
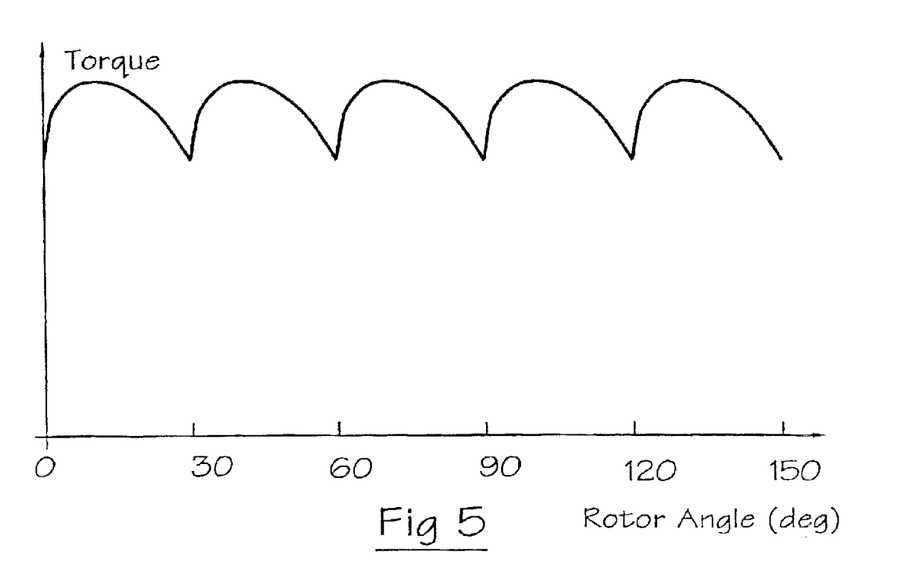
FIG. 5 shows a torque curve from a 3-phase, 6 stator pole, 4 rotor pole machine.

When fed by a constant current, the torque produced by the switched reluctance machine operating as a motor is not constant with angle. For example, FIG. 4 shows the torque produced by a typical small machine as a function of angle and the transition points from one phase to the next are clearly seen. In this example, the machine has 6 phases, 12 stator poles and 10 rotor poles, giving a torque ripple period of 6°, but the general shape is common to machines with other pole numbers—only the number of cycles of torque ripple in one mechanical revolution changes. FIG. 5 shows a torque curve from a 3-phase, 6 stator pole, 4 rotor pole machine, which has a torque ripple period of 30°. Many other combinations of phase and pole number are known in the art, each one having its own torque ripple period.

Figure 6:
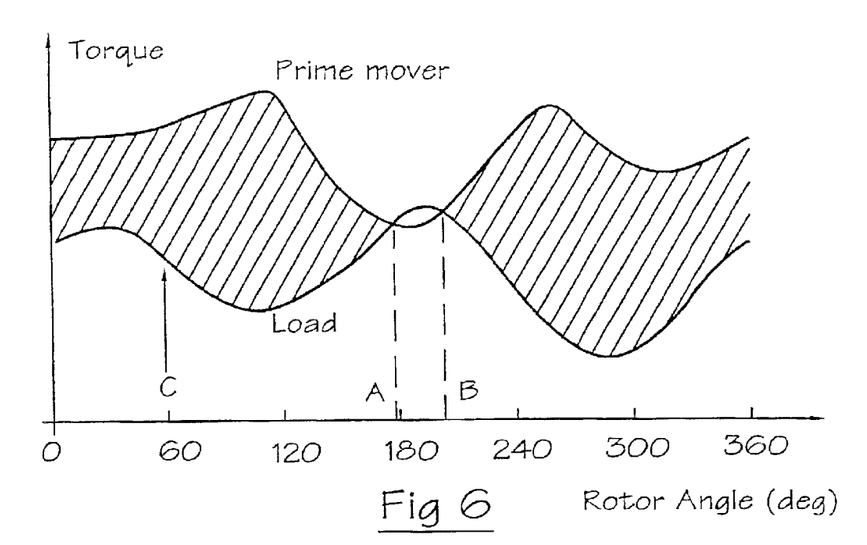
FIG. 6 illustrates the relationship between the torque of a prime mover and the load imposed on it.

The torque profile of a rotating mechanical load is seldom constant with angle, though if the speed is high and/or the inertia is large then the torque ripple is often insignificant to the prime mover. However, if the speed is low, e.g. if the load is being started from rest by a prime mover which has little accelerating torque in hand, the torque ripple of the load becomes important. FIG. 6 shows the torque profiles of an arbitrary prime mover and load over an angular span of one revolution. The torque of the prime mover is above that of the load except between the two points marked A and B. The cross-hatched area indicates the accelerating torque at any angle, i.e. the torque that is available to accelerate the combined inertia of the prime mover and load. Within the angular span A to B, the load demands more torque than is available, so the difference between the curves is decelerating torque. It follows that if the prime mover is energized at, say, point C then the load will be accelerated and will have gained sufficient speed at point A to ride through the decelerating region. It will be realized that it is the relative sizes of the accelerating and decelerating torque regions which determines whether or not the system starts. If, however, the first energization is in the region A to B then the system will not rotate, since the load torque exceeds the prime mover torque.

Figure 7:
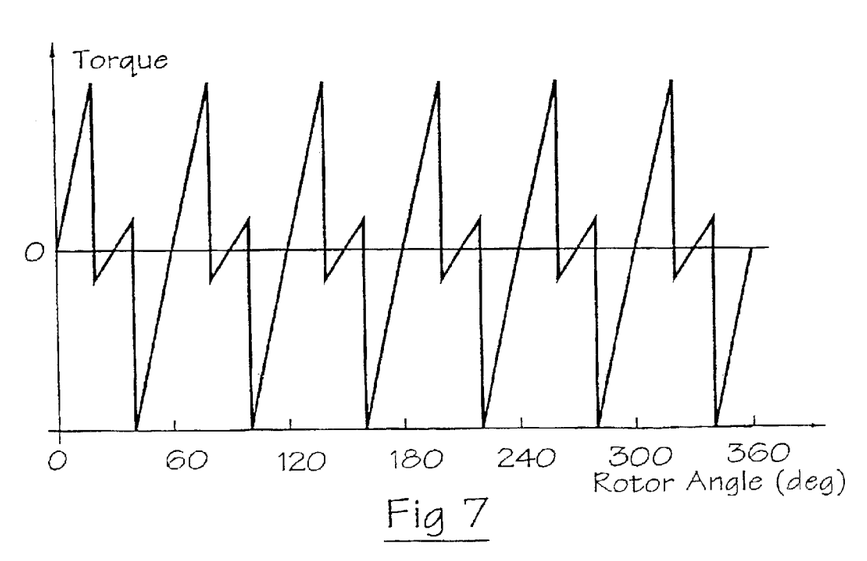
FIG. 7 shows the starting torque requirement of an internal combustion engine.

FIG. 7 shows the linearized starting torque curve for a 6-cylinder, 2-stroke i.c. engine. The six cylinders each contribute one of the "peaks" in the composite curve. The general shape of the curve is typical of internal combustion engines, though the number of peaks and the particular shape of them will be peculiar to specific engine topologies and designs. The curve shown has been linearized for the sake of clarity—in practice there will be higher order effects which introduce slight rounding and other variations to the curve.

Figure 8:
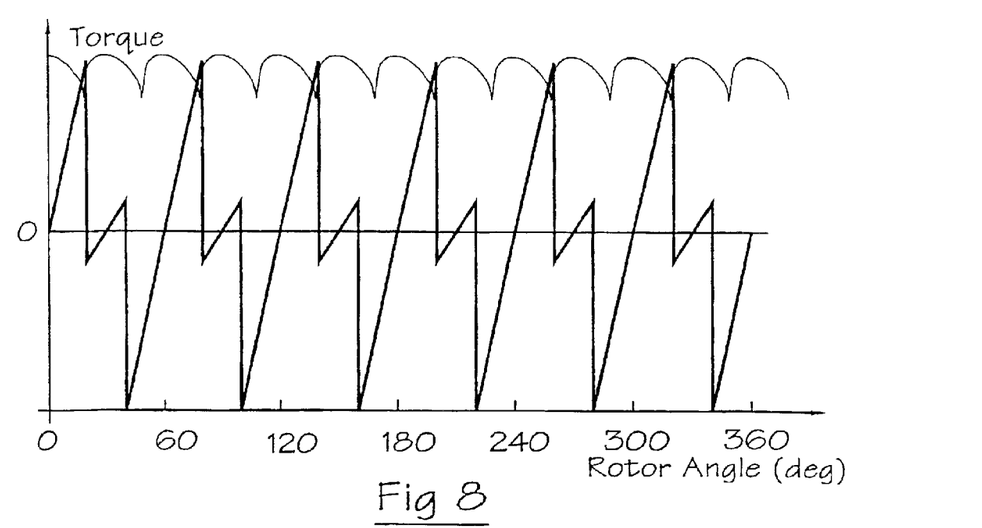
FIG. 8 shows the load profile of FIG. 7 with a characteristic curve of a reluctance motor superimposed.

FIG. 8 shows the load profile of FIG. 7 with the torque/angle curve of a switched reluctance motor superimposed at an arbitrary angle. The motor has twelve "peaks" in 360°, which is characteristic of a 6-stator, 4-rotor pole, 3-phase machine. If this motor is being used as a starter for the engine, then it is clear that it will probably be successful if the engine had come to rest anywhere other than near a peak of its torque curve, but would fail if the engine had come to rest near its peak.

Figure 9:
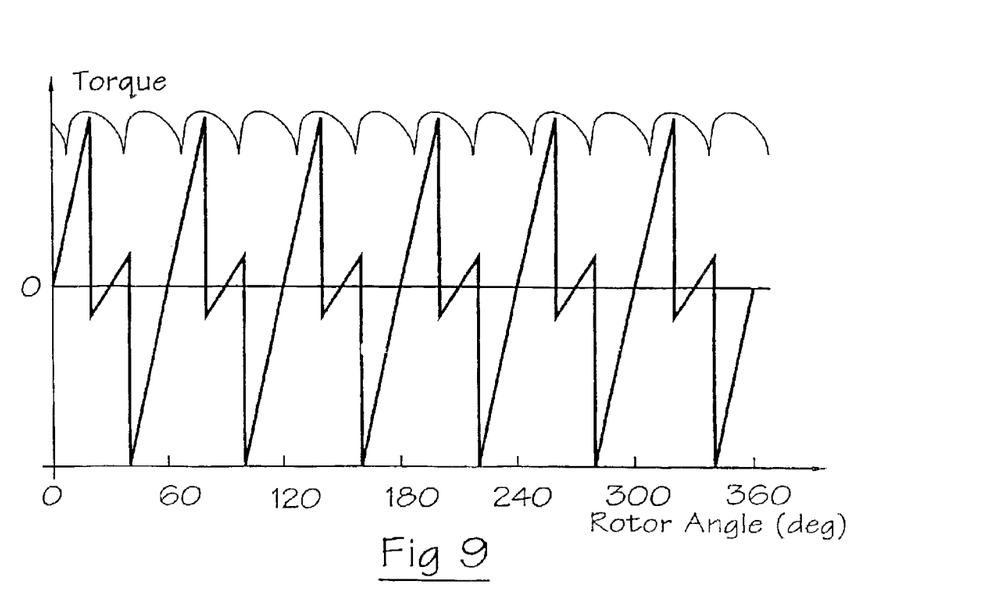
FIG. 9 shows curves according to an embodiment of the invention.

FIG. 9 shows the motor torque curve of FIG. 8 superimposed according to an embodiment of the invention, i.e. where the motor is coupled to the load such that a peak of the motor torque curve is aligned, or at least substantially aligned, with a peak of the load torque curve. This alignment of the torque curves is achieved by aligning the shafts of the motor and the engine in the correct angular position relative to each other. The correct angular position is either known by design or from empirical measurement of the input and output torque curves. If a separate coupling is being used, e.g. coupling 17 in FIG. 1, then the coupling is attached to the shafts and tightened into place when the shafts are in their correct relative positions. If a separate coupling is not being employed, for example, if a mating spline or other such device is used, the features on the shafts which engage with each other must be manufactured into the shafts in the correct orientation with respect to the torque curves of the motor and load, respectively.

The angular orientation of the coupling of the reluctance machine to the i.e. engine is arranged according to embodiments of the invention so that the peak demand falls within the capability of the torque supply and is not coincident with low torque output where it would be incapable of sufficient torque supply. Further, it will be seen that now the motor torque exceeds the load torque at every rotor angle, so the motor will be capable of starting the engine from positions of rest. This is so, even though the average torque of the motor (which will be approximately halfway between the maxima and minima of the curves) is less than the peak of the load curve. Further, due to the "compression/expansion"

aspects of an internal combustion engine cycle, it is found that the engine comes to rest in predefined general positions which are determined by the position of one of the cylinders on a rising stroke towards top dead center on a compression stroke. Minor variations in the rest position will occur, but the general position is still predictable. Thus, it follows that when the machine is coupled to the load according to embodiments of the invention, its output may be smaller than would be expected according to conventional practice, and the inefficiencies and cost of torque ripple smoothing are avoided.

Although the above embodiment has illustrated the invention applied to rotating equipment, the invention can be applied, mutatis mutandis, to linear systems, where force ripple is present in the load and in the prime mover, i.e. the force varies as a function of linear position. In this case the peak of the force ripple of the linear motor is aligned with the peaks of the force demand of the load. It will be appreciated that, according to the invention, the torque output of a rotary motor can be used to drive a linear load by the use of a suitable rotary-to-linear converter, such as a rack and pinion device. Similarly, a force output of a linear motor can be used to drive a rotary load to equal effect.

It will be clear, by inspection of FIGS. 8 and 9, that this method is particularly readily applied when the period of the load variation is the same as, or a small multiple of, the motor output variation. In these circumstances, the benefit of applying embodiments of the invention can be realized in the reduction of the rating of the motor. However, as the period of the motor output variation reduces relative to the load period (for example, if a higher pole number machine were adopted) the likelihood of the motor output being greater than the load at all points reduces. Nevertheless, the benefit of the invention may then be realized in a different way, i.e. in the reduction of acceleration time required to change the speed of the load from zero to a predetermined level, as will now be described.

Figure 10:
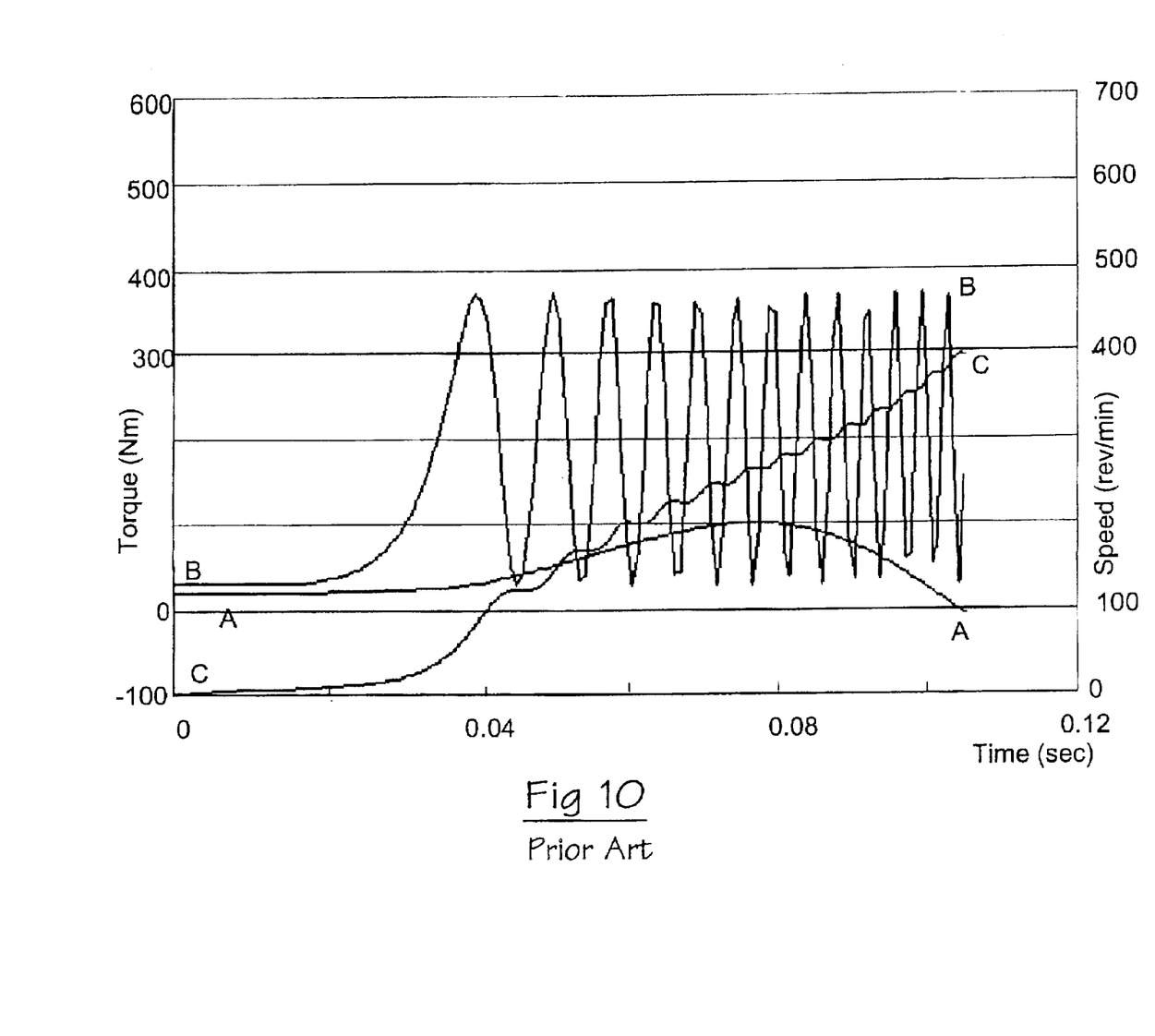
FIG. 10 shows the torques and speed of a prior art system accelerating from rest.

FIG. 10 shows the torque demand of a load (curve A) and the torque output of a motor (curve B), where the period of the variation of the motor torque is much less that that of the load. The load here has a period of 180° and the motor a period of 7.5°. The x-axis is time. The load and motor are so coupled that, at the starting position, the developed output of the motor would be approaching its minimum value, which in this example is 8° before minimum value. Excitation is applied to the motor at zero time, and the developed torque is just sufficient to accelerate the load from rest. Curve C shows the speed of the system as it accelerates and, after 0.105 seconds the speed is about 400 rev/min. It will be seen that at some parts of the motor torque cycle the output falls below that of the load, though the inertia of the system carries the load through these troughs. The effect of these is clearly shown in the speed curve C.

Figure 11:
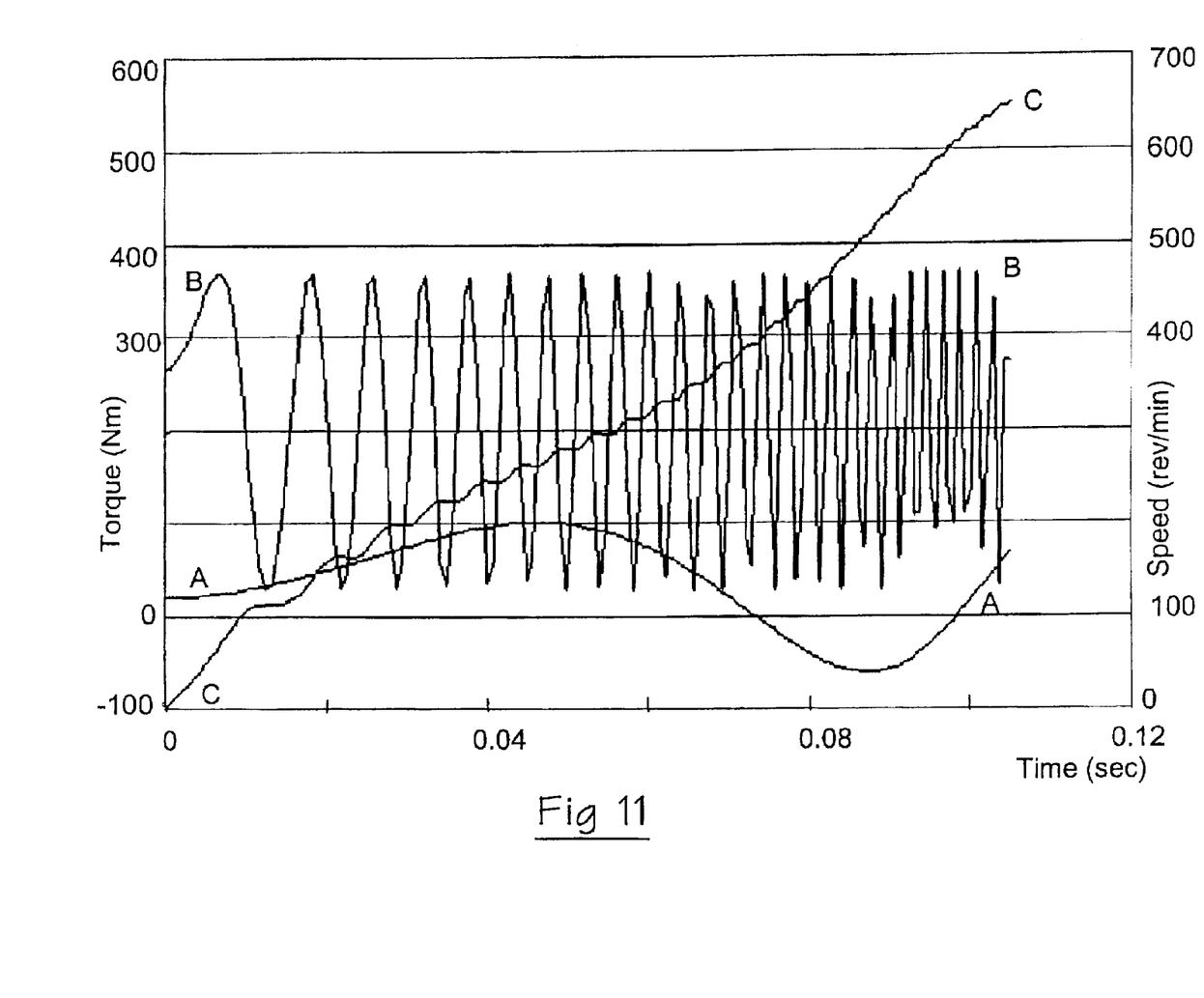
FIG. 11 shows the torques and speed of a system operating according to an embodiment of the invention.

FIG. 11 shows the performance of the motor and load operating according to embodiments of the present invention. The motor is coupled so that its torque is rising to its maximum at standstill at the rest position of the engine to which it is coupled—in this example it is 22° before its peak value. The accelerating torque initially available is some 8 times greater than in FIG. 10, and rising, so the load is rapidly accelerated for the first 0.01 sec. This makes a large difference to the time taken to reach 400 rev/min—it is now approximately 0.074 sec—a reduction of almost 30%. Thus, embodiments of the invention provide a method of starting a load using an electric motor with a cyclically variable output. By exploiting the existence of peaks in the motor output, a lower power motor can provide the same initial responsiveness as a larger motor system not set up according to the invention by boosting the acceleration according to the coupling of the motor relative to the engine load. This is useful in providing initial force or torque in other applications, for example, in actuators or servo-systems, as well as for starting internal combustion engines.

Consider this form of the present invention in terms of the starter/generator for the internal combustion engine, as shown in FIG. 1. The direct drive between the switched reluctance starter motor 12 and the engine 19 is arranged so that the torque output from the motor 12 is rising to a peak when the motor is at rest. As mentioned above, the internal combustion engine will come to rest at predetermined positions, i.e. just before compressive top dead center, for any one of the cylinders of the engine. Thus, there are predefined positions at which the torque output for the motor must be on a rising torque output curve at rest. It is consequently possible, according to embodiments of the invention, to use a lower rated motor at or near its peak output at start-up.

The skilled person will appreciate that variation of the disclosed arrangements is possible without departing from the invention. Accordingly, the above description of several embodiments is made by way of example and not for the purposes of limitation. It will be clear to the skilled person that minor modifications can be made to the arrangements without significant changes to the operation described above. The present invention is intended to be limited only by the scope of the following claims.

What is claimed is:

1. A method of starting a load having a cyclically variable input requirement and a repeatable rest position, the method comprising:

driving the load by an electric motor having a cyclically variable output, including a low output in the output cycle of the motor which is less than a peak in the variable input requirement of the load; and coupling the motor with respect to the load so that the peak input requirement of the load coincides with a region in the output cycle of the motor in which the peak input requirement is exceeded by instantaneous output from the motor and such that the cyclically variable output of the motor is rising at start-up to boost the acceleration of the load from the rest position;

wherein the input requirement of the load and the output of the electric motor are torque; further wherein the cyclical variability of the output of the motor is related to the changing angular position of a rotor of the motor with respect to a stator of the motor.

2. A method as claimed in claim 1 in which the period of the output cycle of the motor is equal to or is an integral dividend of the period of the input requirement cycle of the load.

3. A method as claimed in claim 1, in which the peak input requirement of the load substantially coincides with a peak output of the motor.

4. A method as claimed in claim 1, in which the load is an internal combustion engine and the electric motor is coupled as a starter motor to the engine.

5. A method as claimed claim 1, in which the motor is a switched reluctance motor.

6. A drive system for starting a load having a cyclically variable input requirement and a repeatable rest position, the system comprising:

an electric motor having a cyclically variable output, including a low output in the output cycle of the motor which is less than a peak in the variable input requirement of the load; and a connection between the load and the motor arranged so that the peak input requirement of the load substantially coincides with a region in the output cycle of the motor in which the peak input requirement of the load is exceeded by instantaneous output from the motor and such that the cyclically variable output of the motor is rising at start-up to boost the acceleration of the load from the rest positions;

wherein the input requirement of the load and the output of the electric motor are torque; further wherein the cyclical variability of the output of the motor is related to the changing angular position of a rotor of the motor with respect to a stator of the motor.

7. A system as claimed in claim 6, in which the period of the output cycle of the motor is equal to or is an integral dividend of the period of the input requirement cycle of the load.

8. A system as claimed in claim 6, in which the peak input requirement of the load coincides with a peak output of the motor.

9. A system as claimed in claim 6, in which the load is an internal combustion engine and the electric motor is coupled as a starter motor to the engine.

10. A system as claimed in claim 6, in which the motor is a switched reluctance motor.

11. A method of starting an internal combustion engine having a cyclically variable starting torque requirement and a repeatable rest position, the method comprising:

coupling the engine to a switched reluctance machine having a torque output with a cyclically variable ripple, having a period equal to or an integral dividend of the period of the starting torque requirement of the engine, and which includes a low torque output which is less than a peak in the starting torque requirement of the engine; and arranging the relative angular orientation of the machine and the engine so that a peak in the starting torque requirement of the engine coincides with a region in the torque output of the machine in which the starting torque requirement is exceeded by instantaneous torque output of the machine and such that the cyclically variable output of the machine is rising at start-up to boost the acceleration of the load from the rest positions;

wherein the cyclical variability of the output of the machine is related to the changing angular position of a rotor of the machine with respect to a stator of the machine.

12. A starting system for an internal combustion engine having a cyclically variable starting torque requirement and a repeatable rest position, the system comprising:

a switched reluctance machine, having a torque output with a cyclically variable ripple, having a period equal to or an integral dividend of the period of the starting torque requirement of the engine, and including a low torque output which is less than a peak in the starting torque requirement of the engine, the machine being coupled to the engine such that a peak in the starting torque requirement of the engine coincides with a region in the torque output of the machine in which the starting torque requirement is exceeded by instantaneous torque output of the machine and such that the cyclically variable output of the machine is rising at start-up to boost the acceleration of the load from the rest position;

wherein the cyclical variability of the output of the machine is related to the changing angular position of a rotor of the machine with respect to a stator of the machine.

* * * * *

UNITED STATES PATENT AND TRADEMARK OFFICE
CERTIFICATE OF CORRECTION

PATENT NO. : 6,936,992 B2
DATED : August 30, 2005
INVENTOR(S) : Elliott et al.

It is certified that error appears in the above-identified patent and that said Letters Patent is hereby corrected as shown below:

Column 4,
Lines 33 and 39, "i.e." has been changed to -- i.c. --.

Column 6,
Line 57, "i.e." has been changed to -- i.c. --.

Column 9,
Line 10, "positions" has been changed to -- position --.

Signed and Sealed this

First Day of November, 2005

JON W. DUDAS
*Director of the United States Patent and Trademark Office*